United States Patent
Liu

(10) Patent No.: US 11,144,618 B2
(45) Date of Patent: Oct. 12, 2021

(54) METHODS AND APPARATUSES FOR COPYRIGHT ALLOCATION FOR BLOCKCHAIN-BASED WORK

(71) Applicant: Advanced New Technologies Co., Ltd., Grand Cayman (KY)

(72) Inventor: Lindong Liu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/244,676

(22) Filed: Apr. 29, 2021

(65) Prior Publication Data

US 2021/0248208 A1  Aug. 12, 2021

Related U.S. Application Data

(63) Continuation of application No. PCT/CN2020/073866, filed on Jan. 22, 2020.

(30) Foreign Application Priority Data

Mar. 29, 2019 (CN) .......................... 201910248859.7

(51) Int. Cl.
G06F 21/10 (2013.01)
H04L 9/06 (2006.01)
G06F 16/27 (2019.01)

(52) U.S. Cl.
CPC .............. *G06F 21/10* (2013.01); *G06F 16/27* (2019.01); *H04L 9/0618* (2013.01); *H04L 2209/38* (2013.01); *H04L 2209/603* (2013.01)

(58) Field of Classification Search
CPC ... G06F 21/10; H04L 9/0618; H04L 2209/38; H04L 2209/603
See application file for complete search history.

(56) References Cited

U.S. PATENT DOCUMENTS

2019/0356471 A1* 11/2019 Vaughn ................. G06F 21/602
2020/0020032 A1*  1/2020 Bleznak ............... G06Q 20/223

FOREIGN PATENT DOCUMENTS

CN         107145768         9/2017
CN         107360238         11/2017
(Continued)

OTHER PUBLICATIONS

Zeng et al., A Solution to Digital Image Copyright Registration Based on Consortium Blockchain, 2018, Springer, CCIS 875, pp. 228-237 (Year: 2018).*

(Continued)

*Primary Examiner* — Dao Q Ho
(74) *Attorney, Agent, or Firm* — Fish & Richardson P.C.

(57) ABSTRACT

One or more embodiments of the present specification provide methods and apparatuses for copyright allocation for a blockchain-based work, which are applied to a blockchain network that includes an original author client device, a co-creation participating user client device, and a first node device. The method includes the following: obtaining, by the first node device, a first target transaction from a distributed database of the blockchain, where the first target transaction includes co-creation participating behavior data of the co-creation participating user for a target work, and the target work is originally created by the original author; and invoking a smart contract corresponding to copyright allocation for the target work, executing logic declared in the smart contract for allocating a copyright share to the co-creation participating user based on the co-creation participating behavior data, and allocating a copyright share of the target work to the co-creation participating user.

12 Claims, 2 Drawing Sheets

(56) References Cited

FOREIGN PATENT DOCUMENTS

| | | |
|---|---|---|
| CN | 108537694 | 9/2018 |
| CN | 108805707 | 11/2018 |
| CN | 108960902 | 12/2018 |
| CN | 109146545 | 1/2019 |
| CN | 109191289 | 1/2019 |
| CN | 109246211 | 1/2019 |
| CN | 109272385 | 1/2019 |
| CN | 109274667 | 1/2019 |
| CN | 110046480 | 7/2019 |

OTHER PUBLICATIONS

PCT International Search Report and Written Opinion in International Application No. PCT/CN2020/073866, dated Apr. 22, 2020, 12 pages (with English translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

METHODS AND APPARATUSES FOR COPYRIGHT ALLOCATION FOR BLOCKCHAIN-BASED WORK

CROSS-REFERENCE TO RELATED APPLICATIONS

This application is a continuation of PCT Application No. PCT/CN2020/073866, filed on Jan. 22, 2020, which claims priority to Chinese Patent Application No. 201910248859.7, filed on Mar. 29, 2019, and each application is hereby incorporated by reference in its entirety.

TECHNICAL FIELD

The present specification relates to the field of network communication and data processing technologies, and in particular, to methods and apparatuses for copyright allocation for a blockchain-based work.

BACKGROUND

The blockchain technology, also referred to as a distributed ledger technology, is an emerging technology in which some computing devices jointly participate in "recording a ledger" and jointly maintain a complete distributed database. Because of its features of decentralization, openness and transparency, participation in database recording by each computing device, and fast data synchronization between computing devices, the blockchain technology has been widely used in various fields.

SUMMARY

In view of the previous description, one or more embodiments of the present specification provide a method for copyright allocation for a blockchain-based work, where the method is applied to a blockchain network that includes an original author client device, a co-creation participating user client device, and a first node device; and the method includes the following: the first node device obtains a first target transaction from a distributed database of the blockchain, where the first target transaction includes co-creation participating behavior data of the co-creation participating user for a target work, and the target work is originally created by the original author; and invoking a smart contract corresponding to copyright allocation for the target work, executing logic declared in the smart contract for allocating a copyright share to the co-creation participating user based on the co-creation participating behavior data, and allocating a copyright share of the target work to the co-creation participating user.

In some shown implementations, the co-creation participating behavior data includes dissemination behavior data or creation behavior data or other behavior data of the co-creation participating user for the target work.

In some shown implementations, the first target transaction further includes a unique identifier of the target work.

In some shown implementations, the target work is recorded in the distributed database of the blockchain.

In some shown implementations, the copyright share is a digital asset token circulating on the blockchain.

In some shown implementations, the smart contract further declares copyright share profit allocation logic; the method further includes the following: obtaining a second target transaction from the distributed database of the blockchain, where the second target transaction includes copyright income of the target work sent to the smart contract; and invoking the smart contract, executing the copyright share profit allocation logic declared in the smart contract, and allocating the copyright income to the co-creation participating user based on the copyright share of the target work obtained by the co-creation participating user.

In some shown implementations, the blockchain is a consortium blockchain, and the first node device includes a consortium member node device that provides a co-creation service of the target work.

Correspondingly, one or more embodiments of the present specification further provide an apparatus for copyright allocation for a blockchain-based work, where the apparatus is applied to a blockchain network that includes an original author client device, a co-creation participating user client device, and a first node device; and the apparatus is applied to the first node device and includes the following: an acquisition unit, configured to obtain a first target transaction from a distributed database of the blockchain, where the first target transaction includes co-creation participating behavior data of the co-creation participating user for a target work, and the target work is originally created by the original author; and an execution unit, configured to invoke a smart contract corresponding to copyright allocation for the target work, execute logic declared in the smart contract for allocating a copyright share to the co-creation participating user based on the co-creation participating behavior data, and allocate a copyright share of the target work to the co-creation participating user.

In some shown implementations, the co-creation participating behavior data includes dissemination behavior data or creation behavior data or other behavior data of the co-creation participating user for the target work.

In some shown implementations, the first target transaction further includes a unique identifier of the target work.

In some shown implementations, the target work is recorded in the distributed database of the blockchain.

In some shown implementations, the copyright share is a digital asset token circulating on the blockchain.

In some shown implementations, the smart contract further declares copyright share profit allocation logic; the acquisition unit is further configured to obtain a second target transaction from the distributed database of the blockchain, where the second target transaction includes copyright income of the target work sent to the smart contract; and the execution unit is further configured to invoke the smart contract, execute the copyright share profit allocation logic declared in the smart contract, and allocate the copyright income to the co-creation participating user based on the copyright share of the target work obtained by the co-creation participating user.

In some shown implementations, the blockchain is a consortium blockchain, and the first node device includes a consortium member node device that provides a co-creation service of the target work.

The present specification further provides a computer device, including a memory and a processor, where the memory stores a computer program that can be executed by the processor; and the processor executes the computer program to perform the steps of the previous method for copyright allocation for a blockchain-based work.

The present specification further provides a computer readable storage medium, where the computer readable storage medium stores a computer program, and the computer program is executed by a processor to perform the steps of the previous method for copyright allocation for a blockchain-based work.

According to the method for copyright allocation for a blockchain-based work provided in the present specification, a copyright share of a target work that a user can enjoy is transferred and allocated based on the user's creation participating behavior in the target work, and by using a smart contract deployed on the blockchain. The deployment and invoking and execution results of the smart contract are verified through consensus of node devices on the blockchain, so as to ensure efficient execution of the method for copyright allocation for a blockchain-based work provided in the present specification. In addition, the co-creation participating behavior data of the user for the target work is also recorded in the distributed database of the blockchain. Based on the consensus algorithm and tamper resistance mechanism of the blockchain, the previous data can hardly be counterfeited or tampered with, thereby providing a true and effective data basis for the method for allocating a copyright share of a target work based on the user's creation participating behavior data for the target work.

DETAILED DESCRIPTION

Figure 1:
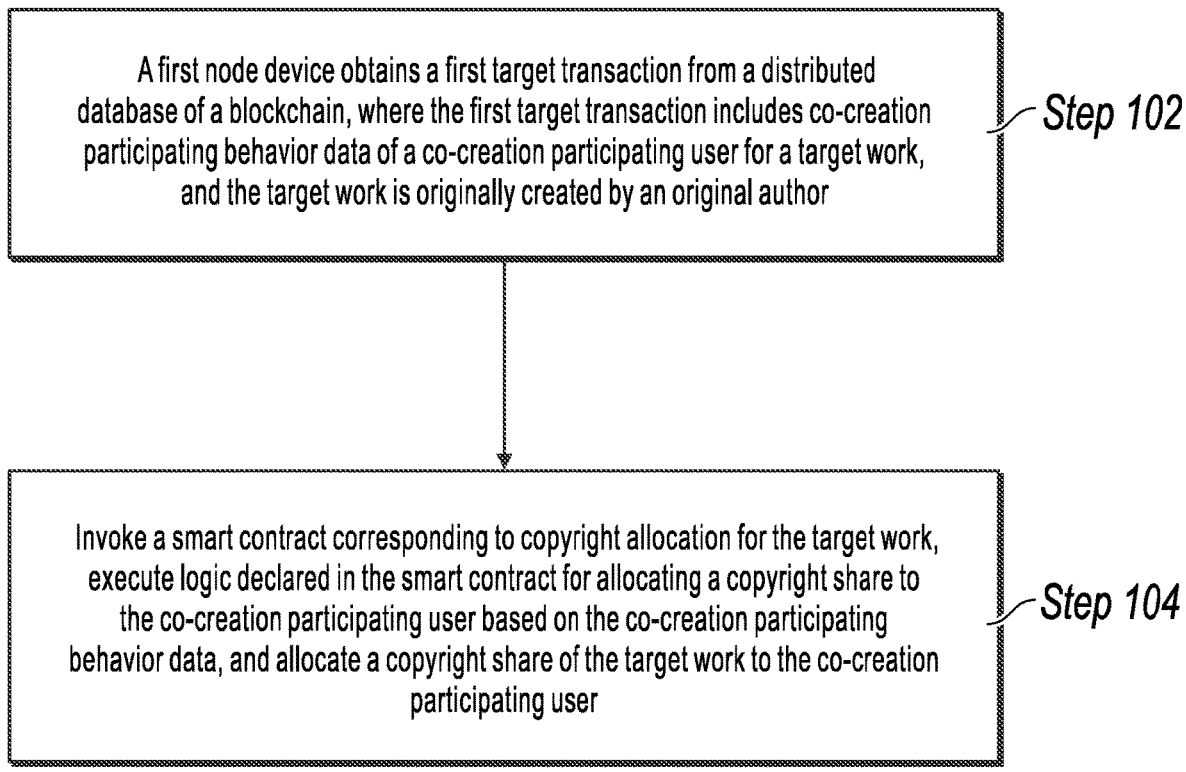
FIG. 1 is a flowchart illustrating a method for copyright allocation for a blockchain-based work, according to some example embodiments of the present specification.

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with one or more embodiments of the present specification. On the contrary, the implementations are only examples of apparatuses and methods that are described in the appended claims in detail and consistent with some aspects of one or more embodiments of the present specification.

It is worthwhile to note that the steps of the corresponding method are not necessarily performed in the order shown and described in the present specification in other embodiments. In some other embodiments, the method can include more or less steps than those described in the present specification. In addition, a single step described in the present specification may be divided into a plurality of steps in other embodiments for description; and a plurality of steps described in the present specification may be combined into a single step for description in other embodiments.

One or more embodiments provided in the present specification show a method for copyright allocation for a blockchain-based work, where the method is applied to a blockchain network that includes an original author client device, a co-creation participating user client device, and a first node device.

Works described in one or more embodiments of the present specification can include intellectual achievements that can be licensed (or copyrighted), such as literature, art, music, or computer programs.

The blockchain network described in one or more embodiments of the present specification can be a peer-to-peer (P2P) network system that is formed by various node devices by using a consensus algorithm and has a distributed data storage structure. The data in the blockchain is distributed in various "blocks" interconnected in terms of time, and a current block includes a data digest of a previous block. In addition, full backup of the data of all or some nodes is achieved based on different consensus algorithms (e.g., Proof Of Work, Proof Of Stake, Delegated Proof Of Stake, Practical Byzantine Fault Tolerance, etc.). It is well known to a person skilled in the art that, because the blockchain network system runs under the corresponding consensus algorithm, the data recorded in the blockchain database can hardly be tampered with by any node. For example, for the blockchain using the POW consensus algorithm, the existing data can be tampered with only by attacks with at least 51% of the computation power of the whole network. Therefore, the blockchain system has incomparable features of data security and tamper resistance over other centralized database systems. Therefore, the data recorded in the distributed database of the blockchain will not be attacked or tampered with, thereby ensuring authenticity and reliability of the data information that has been recorded in the distributed database of the blockchain.

Examples of the blockchain network can include a public blockchain network, a private blockchain network, and a consortium blockchain network. The public blockchain network is open to all entities that use the P2P network and participate in the consensus process. The private blockchain network is provided to a specific entity that centrally controls read and write permissions. The consortium blockchain network is provided to a selected entity group (which controls the consensus process), and includes an access control layer. The implementations of the present specification can be implemented in any suitable type of blockchain network.

The work copyright allocation described in one or more embodiments of the present specification can include allocating a copyright share of a work to a user in the form of certain share(s) divided from the copyright of the work, or in the form of assets corresponding to the shares. The assets corresponding to the copyright shares can include digital assets circulating on the blockchain, or assets corresponding to the assets in the blockchain. For example, the assets can correspond to smart assets such as tokens and digital assets in the blockchain, or can correspond to off-chain assets such as cash, securities, coupons, and real estate outside the blockchain, or can even include feature values such as digital assets and bonus points circulating in the user's digital community, which are not limited in the present specification.

The first node device described in one or more embodiments of the present specification is a device that joins the blockchain by complying with a corresponding node protocol and installing a program that runs the node protocol, and that serves as a node device of the blockchain. As known to a person skilled in the art, a node device with full backup of data in the distributed database of the blockchain is usually referred to as a full node, and a node device with partial backup of data (such as only the data of a block header) in the distributed database of the blockchain is usually referred to as a lightweight node. The first node device described in one or more embodiments of the present specification can be the full node or the lightweight node described previously, which is not limited in the present specification.

The original author described in one or more embodiments of the present specification includes a user who makes original creation of the target work—such as creation, or initial (or first) creation, or primary creation. Correspondingly, the co-creation participating user described in the present specification includes a user who participates in the creation of the target work through adaptation, continuation, or modification, or a user who disseminates and publicizes the target work created by the original author through forwarding, circulation, etc.

In one or more embodiments of the present specification, the user joins the blockchain network by running an installation program for a client device at a terminal. The installation program for the client device can be an installation program of the node device of the blockchain. Correspondingly, the original author client device or the co-creation participating user client device also serves as a node device of the blockchain. The installation program for the client device can alternatively be an access-controlled blockchain user program at the client device that is connected to a previously selected physical node device in the consortium blockchain (consortium member node device). Correspondingly, because the original author client device or the co-creation participating user client device has no permission to directly access the distributed database of the blockchain, the client device is usually not used as a node device (or node) of the blockchain.

It can be seen that the method for copyright allocation for a blockchain-based work provided in the present specification can be applied to any type of blockchain network, such as public blockchain, private blockchain, or consortium blockchain.

To further provide the context of the implementations of the present specification, in a blockchain network, applications can be developed, tested, and deployed for execution within the blockchain network. Example applications can include but are not limited to smart contracts. The smart contract can be described as digital representation of real-world legal contracts with contractual terms that affect the parties. The smart contract is implemented, stored, updated (as needed), and executed within the blockchain network. Contract parties (e.g., a buyer and a seller) associated with the smart contract are represented as nodes in the blockchain network.

In some examples, the smart contract can store data, and the data can be used to record information, facts, associations, balances, and any other information needed to implement contract execution logic. The smart contract can be described as a computer executable program including functions. An instance of the smart contract can be created and a function can be invoked to execute the logic of the smart contract.

In terms of technology, the smart contract can be implemented based on an object and an object-oriented class. For example, the terms and components of the smart contract can be represented as objects that implement application processing for the smart contract. The smart contract (or an object in the smart contract) can invoke another smart contract (or an object in the same smart contract) like other object-oriented objects. For example, invoking performed by an object can be invoking that creates, updates, deletes, propagates, or communicates with an object of another class. Invoking between objects can be implemented by a function, a method, an application programming interface (API), or other invoking mechanisms. For example, a first object can invoke a function to create a second object.

In view of the previous context, the implementations of the present specification are further described here in detail. More specifically, and as described previously, the implementations of the present specification involve the use of a smart contract to allocate a copyright share of the target work to a co-creation participating user.

As shown in FIG. 1, the method for copyright allocation for a blockchain-based work described in one or more embodiments provided in the present specification includes the following steps:

Step 102: The first node device obtains a first target transaction from a distributed database of the blockchain, where the first target transaction includes co-creation participating behavior data of the co-creation participating user for a target work, and the target work is originally created by the original author.

The first node device can be any node device in the blockchain that can invoke and run a smart contract corresponding to work copyright allocation. When the method for copyright allocation for a work provided in the present specification is applied to the consortium blockchain, the first node device can include a consortium member node device that provides a creation service of the target work for the original author client device and the co-creation participating user client device.

The transaction described in the present specification is a piece of data that is created by a node device of the blockchain and needs to be eventually published to a distributed database of the blockchain. Transactions in the blockchain are classified into transactions in a narrow sense and transactions in a broad sense. A transaction in a narrow sense refers to a value transfer that is published by a user to the blockchain. For example, in a conventional bitcoin blockchain network, a transaction can be a funds transfer initiated by a user in the blockchain. A transaction in a broad sense refers to a piece of service data with a service intent that is published by a user to the blockchain through a node device. For example, the first target transaction described in these embodiments includes the co-creation participating behavior data of the co-creation participating user for the target work, for example, the dissemination behavior data or creation behavior data or other behavior data of the co-creation participating user for the target work.

In these embodiments, the target work is originally created by the original author. As described previously, the original creation of a work can include creation, initial (or first) creation, primary creation, or other behavior of the work.

The dissemination behavior data of the co-creation participating user for the target work includes data generated by social dissemination behavior of the target work, such as attention, like, comment, forwarding, and invitation. The creation behavior data of the co-creation participating user for the target work includes data generated by creation participating behavior of the target work, such as continuation, rewriting, adaptation, or text editing and manuscript proofreading verification. It can be determined that the target work can be a work that is created independently by the original author and assisted by the co-creation participating user in social dissemination, or can be a work that is jointly created by the original author and the co-creation participating user, or assisted by the co-creation participating user in social dissemination.

It is worthwhile to note that, these embodiments do not impose a limitation on the sender who sends the first target transaction to the distributed database of the blockchain. When the co-creation participating user client device serves as a node device of the blockchain, the first target transaction can be sent by the co-creation participating user client device to the blockchain. When the blockchain is a consortium blockchain, and the co-creation participating user client device serves as a user client device connected to the consortium member node, the first target transaction can be a first target transaction that the consortium member node sorts the co-creation participating behavior data of the co-creation participating user client device for the target work into the first target transaction and sends to the blockchain.

In some shown implementations, to label the target work, the first target transaction can further include the unique identifier of the target work, for example, the identification ID of the target work, the storage address of the target work, etc., so as to help invoke the copyright allocation logic related to the target work in the smart contract.

In some shown implementations, the target work is recorded in the distributed database of the blockchain, thereby providing recording evidence for the specific content or co-creation process of the target work. These embodiments do not impose a limitation on the specific form in which the target work is recorded in the distributed database of the blockchain. The full text of the target work can be stored in the distributed database of the blockchain to record the target work based on the tamper resistance mechanism of the blockchain. Alternatively, a mathematical digest (such as a hash digest) of the target work can be stored in the distributed database of the blockchain to record the target work based on the tamper resistance mechanism of the blockchain and the mathematical digest algorithm, and so on.

Similarly, these embodiments do not impose a limitation on an identity of the sender of the recording information for recording the target work. When the original author client device serves as a node device of the blockchain, the target work can be sent by the original author client device to the blockchain. When the blockchain is a consortium blockchain, and the original author client device or the co-creation participating user client device serves as a user client device connected to the consortium member node, the target work can be that the original author client device or the co-creation participating user client device sends the target work to the consortium member node, and the consortium member node sends the recording information of the target work to the blockchain.

Step 104: Invoke a smart contract corresponding to copyright allocation for the target work, execute logic declared in the smart contract for allocating a copyright share to the co-creation participating user based on the co-creation participating behavior data, and allocate a copyright share of the target work to the co-creation participating user.

After the consensus and verification of the node device of the blockchain, the smart contract corresponding to the work copyright allocation can be deployed in the blockchain. The logic for allocating a copyright share to the co-creation participating user described in these implementations can include a rule for allocating a copyright share of the target work to the co-creation participating user based on the co-creation participating behavior data. For example, every time the co-creation participating user completes predetermined co-creation participating behavior, a corresponding copyright share reward should be obtained; alternatively, a threshold is predetermined for the co-creation participating behavior of the co-creation participating user, and it is determined whether the co-creation participating behavior completed by the co-creation participating user reaches the predetermined threshold; if the predetermined threshold is reached, a corresponding copyright share reward of the target work should be obtained; alternatively, weights can be respectively set for different types of co-creation participating behavior completed by the co-creation participating user, and it is measured, based on the type and the quantity of the co-creation participating behavior completed by the co-creation participating user, whether the co-creation participating user completes the co-creation participating behavior of the predetermined threshold, and so on, which is not limited in the present specification. A person skilled in the art can design a work copyright allocation logic or rule that is in line with ecological development of the work co-creation service based on a specific service scenario, so as to allocate a copyright share matching contribution of the co-creation participating user to the co-creation participating user who makes contribution for the ecological development of the work co-creation service, thereby encouraging the co-creation participating user.

As described in the previous embodiments, allocating a copyright share of the target work to the co-creation participating user includes the following: the smart contract corresponding to the work copyright allocation transfers a corresponding amount of copyright share to the address or account of the co-creation participating user. As described previously, the copyright share of the target work refers to certain share(s) divided from the copyright of the target work, or assets corresponding to the shares. The assets can include digital assets circulating on the blockchain, such as digital tokens that are circulated on the blockchain and that are set according to a protocol of the blockchain, or can include a value of credit limit corresponding to resources outside the blockchain, for example, a value of credit limit corresponding to resources such as off-chain cash, real estate, precious metals, copyright share certificates, and even virtual resources circulating in the digital community.

In some shown implementations, the copyright share is represented as a digital token circulating on the blockchain, so as to help allocate the copyright of the target work to the co-creation participating user directly in the form of funds transfer through a smart contract. In these implementations, in addition to recording, in the distributed database of the blockchain, the first target transaction for invoking the smart contract to transfer money, the transferred copyright share can be directly reflected by an increase in the token balance of the blockchain account of the co-creation participating user, which is similar to user account settings for the Ethereum blockchain.

In some shown implementations, when the copyright share is represented as a value of credit limit corresponding to a resource that is set outside the blockchain, recording the first target transaction in the distributed database of the blockchain is considered as that an evidence is provided for the copyright share allocation for the target work, or means that the smart contract sends, to the distributed database of the blockchain, a transaction that transfers a value of credit limit for an off-chain asset corresponding to the copyright share to the co-creation participating user, thereby providing evidence for the transfer of the resource that is set outside the blockchain.

In some shown implementations, the consensus on the smart contract can include a consensus on the work copyright allocation logic or rule declared in the smart contract, so as to ensure that the work copyright allocation logic is verified by a plurality of parties. In addition, a person skilled in the art should know that the invoking and execution results of the smart contract need to be verified through consensus of the blockchain node device before they can be recorded in the distributed database of the blockchain. Therefore, compared with the rules formulated and executed by centralized service providers, the method for copyright allocation for the work provided in one or more embodiments of the present specification has obvious fairness and impartiality.

In the following description, for example, the target work is a literary work. The smart contract used for copyright allocation can establish a mapping relationship between a copyright share and a token, and establish a rule for allocating a copyright share or token that should be obtained based on the co-creation participating behavior of the co-creation participating user. The co-creation participating behavior can include: social dissemination behavior such as attention, like, comment, forwarding, and invitation; and creation behavior such as manuscript proofreading verification and document writing. The allocation rule can include: allocating a token corresponding to copyright share quota for the co-creation participating user based on one or more indicators resulting from the social dissemination behavior of the co-creation participating user, such as unique visitor (UV), page view (PV), readings, reading validity, secondary dissemination, whether to purchase, or purchase quantity; or allocating a token corresponding to copyright share quota for the co-creation participating user based on importance of a role of the co-creation participating user in the co-created work, and an amount of content that participates in the continuation and serialization of the work. Certainly, the smart contract can alternatively deploy dynamic evaluation and allocation logic, and allocate, within a predetermined time, a corresponding copyright share based on a total amount of co-creation participating behavior of the co-creation participating user, and so on.

In some shown implementations, after the user obtains the corresponding copyright share, as a shareholder of the target work, the user can further enjoy the right to obtain equity income based on the income of the target work. Correspondingly, the smart contract further declares copyright share profit allocation logic; the method further includes the following: obtaining a second target transaction from the distributed database of the blockchain, where the second target transaction includes copyright income of the target work sent to the smart contract; and invoking the smart contract, executing the copyright share profit allocation logic declared in the smart contract, and allocating the copyright income to the co-creation participating user based on the copyright share of the target work obtained by the co-creation participating user.

Similar to the copyright share, the copyright income described in these embodiments can include digital assets circulating on the blockchain, or assets corresponding to the assets in the blockchain. For example, the assets can correspond to smart assets such as tokens and digital assets in the blockchain, or can correspond to off-chain assets such as cash, securities, coupons, and real estate outside the blockchain, or can even include feature values such as digital assets and bonus points circulating in the user's digital community, which are not limited in the present specification.

The smart contract for allocating work copyright described in one or more embodiments can allocate a corresponding copyright share of the target work to the co-creation participating user based on the co-creation participating behavior of the co-creation participating user. The copyright share can be represented as a certificate of shares or be directly represented as assets, thereby giving resource income to the co-creation participating user and encouraging the user to participate more actively in the dissemination or creation of the target work. Further, when the target work generates copyright income (the copyright income can be directly received in the smart contract account corresponding to the work copyright allocation, or can be indirectly transferred to the smart contract account corresponding to the work copyright allocation in the form of resource transfer), the corresponding copyright income (i.e., copyright share profit) can also be allocated to the co-creation participating user based on the copyright share obtained by the co-creation participating user. The smart contract can be invoked at any time based on the co-creation participating behavior of the co-creation participating user, reducing time and labor costs for real-world communication, ensuring fairness and impartiality, improving the efficiency of resource transfer, and effectively encouraging users to enhance their own service activeness so as to increase resource income of individual users.

Figure 3:
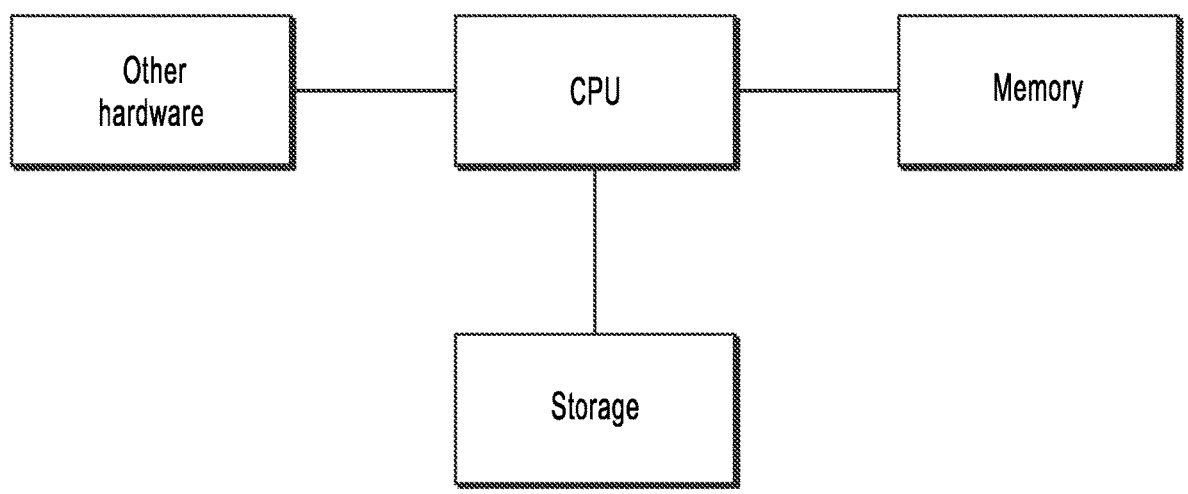
FIG. 3 is a diagram illustrating a hardware structure for running an apparatus for copyright allocation for a blockchain-based work, according to some embodiments of the present specification.

Corresponding to the process implementation of the previous method for copyright allocation for a blockchain-based work, some embodiments of the present specification further provide an apparatus for copyright allocation for a blockchain-based work. The apparatus can be implemented by software, or can be implemented by hardware or a combination of software and hardware. For example, the apparatus is implemented by software. A logical apparatus is formed when a central processing unit (CPU) of a device in which the apparatus is located reads a corresponding computer program instruction into the memory for running. In terms of hardware, in addition to the CPU, storage, and memory shown in FIG. 3, the device in which the data processing apparatus is located generally further includes other hardware such as a chip for transmitting and receiving wireless signals, and/or other hardware such as a board for implementing network communication functions.

Figure 2:
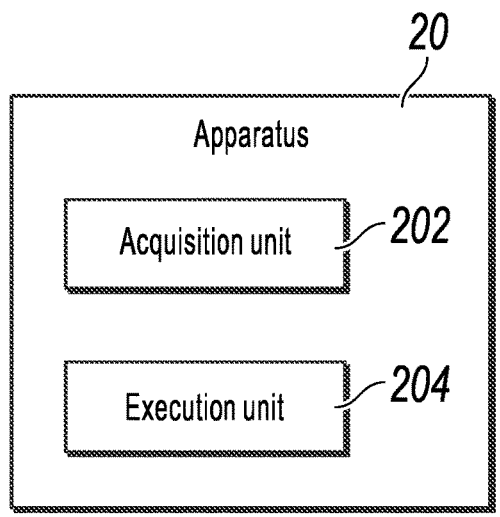
FIG. 2 is a schematic structural diagram illustrating an apparatus for copyright allocation for a blockchain-based work, according to some example embodiments of the present specification.

FIG. 2 shows an apparatus 20 for copyright allocation for a blockchain-based work provided in one or more embodiments of the present specification. The apparatus 20 is applied to a blockchain network that includes an original author client device, a co-creation participating user client device, and a first node device; and the apparatus 20 is applied to the first node device and includes the following: an acquisition unit 202, configured to obtain a first target transaction from a distributed database of the blockchain, where the first target transaction includes co-creation participating behavior data of the co-creation participating user for a target work, and the target work is originally created by the original author; and an execution unit 204, configured to invoke a smart contract corresponding to copyright allocation for the target work, execute logic declared in the smart contract for allocating a copyright share to the co-creation participating user based on the co-creation participating behavior data, and allocate a copyright share of the target work to the co-creation participating user.

In some shown implementations, the co-creation participating behavior data includes dissemination behavior data or creation behavior data or other behavior data of the co-creation participating user for the target work.

In some shown implementations, the first target transaction further includes a unique identifier of the target work.

In some shown implementations, the target work is recorded in the distributed database of the blockchain.

In some shown implementations, the copyright share is a digital asset token circulating on the blockchain.

In some shown implementations, the smart contract further declares copyright share profit allocation logic; the acquisition unit 202 is further configured to obtain a second target transaction from the distributed database of the blockchain, where the second target transaction includes copyright income of the target work sent to the smart contract; and the execution unit 204 is further configured to invoke the smart contract, execute the copyright share profit allocation logic declared in the smart contract, and allocate the copyright income to the co-creation participating user based on the copyright share of the target work obtained by the co-creation participating user.

In some shown implementations, the blockchain is a consortium blockchain, and the first node device includes a consortium member node device that provides a co-creation service of the target work.

For an implementation process of functions and roles of each unit in the apparatus 20, references can be made to an implementation process of corresponding steps in the previous method. For related parts, references can be made to related descriptions in the method embodiments, and details are omitted here for simplicity.

The previously described apparatus embodiments are merely examples. The units described as separate parts can or does not have to be physically separate, and parts displayed as units can or does not have to be physical modules, can be located in one position, or can be distributed on a plurality of network modules. Some or all of the units or modules can be selected depending on actual needs to achieve the objectives of the solutions of the present specification. A person of ordinary skill in the art can understand and implement the embodiments of the present specification without creative efforts.

The apparatus, unit, or module illustrated in the previous embodiments can be implemented by using a computer chip or an entity, or can be implemented by using a product having a specific function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous blockchain transaction method embodiments, the embodiments of the present specification further provide a computer device. The computer device includes a memory and a processor. The memory stores a computer program that can be executed by the processor. The processor executes the stored computer program to perform the steps of the method for copyright allocation for a blockchain-based work performed by the node device of the blockchain in the embodiments of the present specification. For detailed descriptions of the steps of the method for copyright allocation for a blockchain-based work performed by the node device of the blockchain, references can be made to the previous content, and details are omitted here for simplicity.

Corresponding to the embodiments of the previous method for copyright allocation for a blockchain-based work, some embodiments of the present specification further provide a computer readable storage medium. The storage medium stores a computer program, and the computer program is executed by a processor to perform the steps of the method for copyright allocation for a blockchain-based work performed by the node device of the blockchain in the embodiments of the present specification. For detailed descriptions of the steps of the method for copyright allocation for a blockchain-based work performed by the node device of the blockchain, references can be made to the previous content, and details are omitted here for simplicity.

The previous descriptions are merely example embodiments of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. Information can be a computer readable instruction, a data structure, a module of a program or other data.

Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include," "contain," or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that the embodiments of the present specification can be provided as a method, a system, or a computer program product. Therefore, the embodiments of the present specification can use a form of hardware only embodiments, software only embodiments, or embodiments with a combination of software and hardware. Moreover, the embodiments of the present specification can use a form of a computer program product that is implemented on one or more computer-usable storage media (including but not limited to a disk memory, a CD-ROM, an optical memory, etc.) that include computer-usable program code.

What is claimed is:

1. A method for copyright allocation for a blockchain-based work in a blockchain network, the method comprising:

obtaining, by a first node device, a first target transaction from a distributed database of a blockchain, wherein the first target transaction comprises co-creation participating behavior data of a co-creation participating user for a target work and a unique identifier of the target work, the co-creation participating behavior data comprises behavior data of the co-creation participating user for the target work, and the target work is originally created by an original author;

invoking a smart contract corresponding to copyright allocation for the target work, executing logic declared in the smart contract for allocating a copyright share to the co-creation participating user based on the co-creation participating behavior data, and allocating the copyright share of the target work to the co-creation participating user, wherein the copyright share is a digital asset token circulating on the blockchain, and the smart contract further declares copyright share profit allocation logic;

obtaining a second target transaction from the distributed database of the blockchain, wherein the second target transaction comprises copyright income of the target work sent to the smart contract; and invoking the smart contract, executing the copyright share profit allocation logic declared in the smart contract, and allocating the copyright income to the co-creation participating user based on the copyright share of the target work obtained by the co-creation participating user.

2. The method of claim 1, wherein the behavior data comprises dissemination behavior data or creation behavior data.

3. The method of claim 1, wherein the target work is recorded in the distributed database of the blockchain.

4. The method of claim 1, wherein the blockchain is a consortium blockchain, and the first node device comprises a consortium member node device that provides a co-creation service of the target work.

5. An apparatus for copyright allocation for a blockchain-based work in a blockchain network, the apparatus comprising:

one or more processors; and one or more computer memory devices interoperably coupled with the one or more processors and having tangible, non-transitory, machine-readable media;

an acquisition unit, executed by the one or more processors, configured to obtain a first target transaction from a distributed database of a blockchain, wherein the first target transaction comprises co-creation participating behavior data of a co-creation participating user for a target work and a unique identifier of the target work, the co-creation participating behavior data comprises behavior data of the co-creation participating user for the target work, and the target work is originally created by an original author; and an execution unit, executed by the one or more processors, configured to invoke a smart contract corresponding to copyright allocation for the target work, execute logic declared in the smart contract for allocating a copyright share to the co-creation participating user based on the co-creation participating behavior data, and allocate the copyright share of the target work to the co-creation participating user, wherein the copyright share is a digital asset token circulating on the blockchain, and the smart contract further declares copyright share profit allocation logic, wherein the acquisition unit is further configured to obtain a second target transaction from the distributed database of the blockchain, wherein the second target transaction comprises copyright income of the target work sent to the smart contract, and wherein the execution unit is further configured to invoke the smart contract, executing the copyright share profit allocation logic declared in the smart contract, and allocate the copyright income to the co-creation participating user based on the copyright share of the target work obtained by the co-creation participating user.

6. The apparatus of claim 5, wherein the behavior data comprises dissemination behavior data or creation behavior data.

7. The apparatus of claim 5, wherein the target work is recorded in the distributed database of the blockchain.

8. The apparatus of claim 5, wherein the blockchain is a consortium blockchain, and wherein the apparatus comprises a first node device that comprises a consortium member node device that provides a co-creation service of the target work.

9. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a first target transaction from a distributed database of a blockchain, wherein the first target transaction comprises co-creation participating behavior data of a co-creation participating user for a target work and a unique identifier of the target work, the co-creation participating behavior data comprises behavior data of the co-creation participating user for the target work, and the target work is originally created by an original author;

invoking a smart contract corresponding to copyright allocation for the target work, executing logic declared in the smart contract for allocating a copyright share to the co-creation participating user based on the co-creation participating behavior data, and allocating the copyright share of the target work to the co-creation participating user, wherein the copyright share is a digital asset token circulating on the blockchain, and the smart contract further declares copyright share profit allocation logic;

obtaining a second target transaction from the distributed database of the blockchain, wherein the second target transaction comprises copyright income of the target work sent to the smart contract; and invoking the smart contract, executing the copyright share profit allocation logic declared in the smart contract, and allocating the copyright income to the co-creation participating user based on the copyright share of the target work obtained by the co-creation participating user.

10. The computer-implemented system of claim 9, wherein the behavior data comprises dissemination behavior data or creation behavior data.

11. The computer-implemented system of claim 9, wherein the target work is recorded in the distributed database of the blockchain.

12. The computer-implemented system of claim 9, wherein the blockchain is a consortium blockchain, and the system comprises a consortium member node device that provides a co-creation service of the target work.

* * * * *